Figure 1:
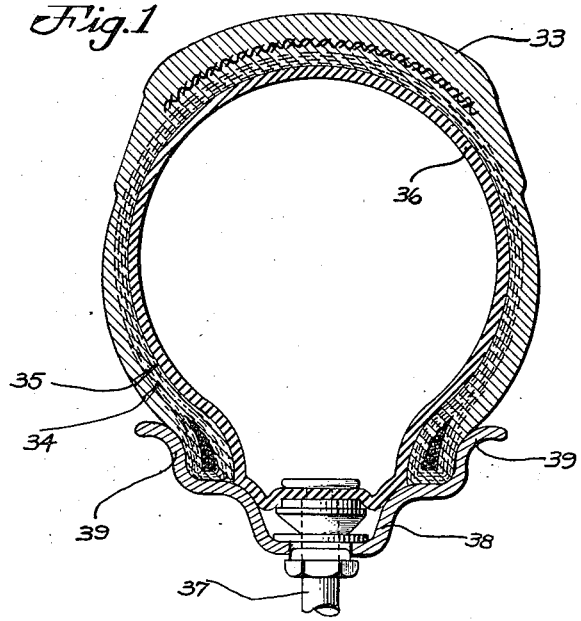

July 14, 1936.    R. B. DAY    2,047,858

VENTED RUBBER ARTICLE

Original Filed Sept. 4, 1931

Inventor
Ralph B. Day

By

Attorney

Patented July 14, 1936

2,047,858

UNITED STATES PATENT OFFICE 2,047,858

VENTED RUBBER ARTICLE

Ralph B. Day, Akron, Ohio, assignor to Wingfoot Corporation, Wilmington, Del., a corporation of Delaware Original application September 4, 1931, Serial No. 561,122. Divided and this application September 29, 1934, Serial No. 746,227. In Canada May 26, 1932

10 Claims. (Cl. 152—13)

This invention relates to improvements in rubber articles and more particularly to pneumatic tires wherein fluid pressure is utilized to expand the tires while in use on vehicles. This application is a division of my application Serial No. 561,122 filed September 4, 1931 and is directed in part to the article produced by the method and apparatus disclosed in the above mentioned application and in application Serial No. 510,101, filed January 21, 1931. This application also might be said to be a division of my application Serial No. 631,202 filed August 31, 1932.

Heretofore it has been customary in building pneumatic tires to provide a tire which, when mounted on a rim and inflated is practically impervious to gases and which will not permit the escape of any fluid contained therein. Likewise, it has been customary to provide an impervious rim for this impervious tire. The inflation of this impervious tire is usually accomplished by means of a separate inflatable inner tube disposed therein or by means of an inner tube permanently secured or mounted integrally with the inner wall of the tire in a structure known as a single tube tire.

In using this impervious tire and rim on a vehicle, numerous obstacles have been encountered. For example, there is a natural seepage of the inflating fluid through the inner tube and into the carcass of the tire and the latter being impervious does not permit the escape of this seeping fluid. The impervious rim also prevents escape of this fluid and as a consequence the fluid permeates the cords of the carcass and tends to flow along and through these cords, but as the fluid cannot escape through the relatively thick sidewalls or tread it forms blisters in the walls of the tread and frequently causes blowouts at these points. Likewise, tubes occasionally have small holes, such as pin holes therein, through which the fluid passes into the carcass and similar troubles occur.

I have discovered that if some means is provided to permit the escape to the atmosphere of fluids contained within or entering into the carcass of the tire, or to permit the escape of fluids from the structure after they have seeped or leaked through the tube and before they enter the carcass, many if not all, of the troubles incident to the action of such fluids will be overcome, and tires provided with such means are herein referred to as "vented" tires. There are many ways of venting a tire, such as by exposing the cords or fibrous material of the carcass directly to the atmosphere, or by interposing additional pervious material between the carcass and the atmosphere, thereby indirectly venting the tire. A few of the many ways are herein described.

It will be apparent that a vented tire easily may be obtained by first vulcanizing the tire in the usual manner and subsequently venting the same, but I have discovered a novel method of and apparatus for vulcanizing pneumatic tires whereby a tire, when taken from the vulcanizing mold, already is provided with venting means thus eliminating any subsequent necessity for venting the tire. This method and apparatus are fully disclosed in said applications 561,122 and 510,101 filed September 4, 1931 and January 21, 1931 respectively.

It is an object of this invention to provide a pneumatic tire in which the side walls and tread portion will not be subject to blister formation or blow-outs from the fluid within the tire.

Another object is to provide a pneumatic tire which is not pervious to fluid contained within the tire, and which has leaked or seeped through the tube.

A further object is to provide a pneumatic structure provided with novel means for venting the tire.

Other objects and advantages will become apparent from the following description.

In the drawing I have shown several embodiments of the invention, in this showing, Fig. 1 is a cross section of a tire illustrating a vulcanized vented tire mounted on a rim; and—

Figure 2:
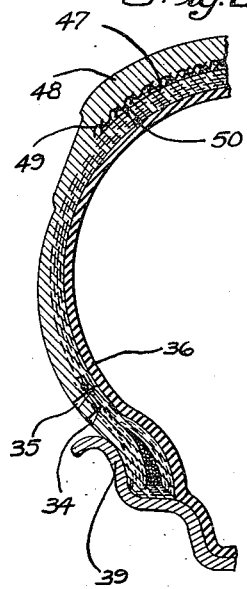
Figure 3:
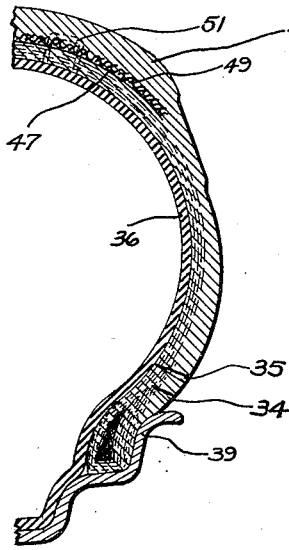
Figure 4:
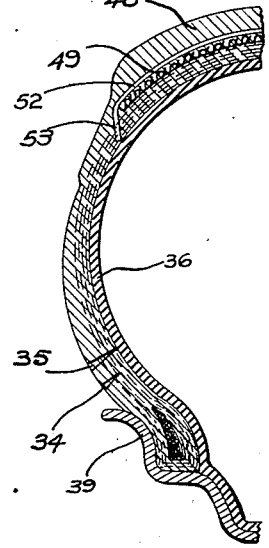

Figs. 2, 3 and 4 are cross sections of half a tire each showing a somewhat modified form of vented tire.

Referring now to Fig. 1 of the drawing, the numeral 33 indicates a tire as a whole of the usual construction, preferably vulcanized by the method and apparatus described in my aforesaid applications, wherein tubular needles or the like extend from the cords of the tire to permit bleeding of the tire during vulcanization. The numeral 34 indicates one or more of the openings left in the tire after the needles have been removed therefrom after vulcanization, thereby providing one or more passageways between the cords of the tire and the atmosphere to vent fluids from the carcass. If desired, additional openings such as indicated at 35, also may be provided in the tire extending substantially through the sidewalls thereof, but the provision of these latter openings is not essential.

The tire 33 is provided with an inflated inner tube which may be separable therefrom or which may be formed as an integral part thereof. A conventional valve 37 is carried by the inner tube and is secured in proper position in a rim 38 provided with the usual bead retaining flanges 39, whereby the tire may be mounted in the rim in the usual manner.

The tire disclosed in Fig. 1 is a vented tire as long as the openings 34 and 35 if used, are above and adjacent the flanges 39 whereby fluids which seep through the tube 36 or which leak therethrough from pinholes or the like may pass along the cords of the carcass and out of the tire through the vent openings. In this manner it will be apparent that the formation of blisters in the sidewalls or tread and consequent blow-outs are prevented because the fluid is not permitted to remain in the carcass.

In connection with the venting of tires it will be observed that a vented tire of the type disclosed in Fig. 1 need not be produced in accordance with the method and apparatus disclosed in my applications but a tire produced in any manner may have one or more openings similar to the openings 34 and 35 punched therein by means of a small awl or drill and as long as the openings are above and adjacent the flanges 39 such a tire will be a vented tire within the scope of this invention. Moreover it will be apparent that, if a rim of the type illustrated in the copending application of B. Darrow, Serial No 571,728 is used the tire need not be vented above the flange but may be vented at any point which will permit communication with one or more of the openings in said rim.

It is desirable to locate the openings 34 and 35 with either of them adjacent the rim flanges instead of at points further up on the side wall of the tire in order to make difficult the entrance of ordinary water into the carcass. Of course, if the tire is run through deep water some will enter the openings 34 and 35 but not enough to do any harm unless the tire is continuously run in deep water which, however, is a very unlikely use for a tire.

Occasionally fluid will break through the thin strip of rubber compound 47 located between the outer ply of the tire 48 and the breaker strip 49 illustrated in Fig. 2, to the breaker strip and has difficulty in returning to the cords of the plies whereby it may be bled from the carcass. Accordingly, in such cases, I provide means in the form of one or more passageways communicating with the plies and breaker strip. For example, I may provide an opening 50, communicating with the breaker strip and the interior of the tire and passing adjacent the cords of the fabric plies whereby such fluids may pass downwardly and out of the carcass through the openings 34 and 35 or any other suitable venting means.

The same result accomplished by the structure in Fig. 2 also may be accomplished by the structure in Fig. 3, wherein a cord 51 or the like of fibrous permeable material is imbedded in the carcass between the interior of the tire and the breaker strip 49 passes adjacent the cords of the fabric plies. Obviously fluids in the breaker strip will be conducted to the cords of the plies and pass out of the tire in this instance through the openings 34 and 35.

Likewise, fluid may be conducted from the breaker strip 49 by means of one or more transversely extending cords 52 of fibrous, permeable material which are contiguous to the cords of the breaker strip and communicate near their ends with the cords of the plies as indicated at 53 in Fig. 4. Fluids will pass along the cords 52 into the cords of the carcass and in this instance pass out through the openings 34 and 35.

It is believed to be apparent that I have provided a novel pneumatic tire and means for venting tires in various ways.

Although I have illustrated a number of preferred forms of the invention and have described those forms in detail it will be apparent to those skilled in the art that the invention is not so limited, but that various modifications may be made therein without departing from the spirit of the invention or from the scope of the sub-joined claims.

What I claim is:

1. A vulcanized pneumatic tire including plies of cord fabric having a rubber covering thereover, said rubber covering being provided with a radial vent passageway adjacent one of the tire beads and entirely to one side thereof, the arrangement of the passageway being such that it will communicate with the atmosphere and the cords of said fabric when the tire is mounted on a supporting rim.

2. A vulcanized pneumatic tire including plies of fabric having a rubber covering thereover and bead portions, said rubber covering being provided with one or more substantially radial vent passageways adjacent at least one of said bead portions but spaced far enough from said latter portion to communicate with the atmosphere and the cords of said fabric when the tire is mounted on a supporting rim and being entirely to one side and entirely above said bead.

3. A vulcanized pneumatic tire including plies of fabric having a rubber covering thereover and a breaker strip imbedded in said rubber covering, means providing a passageway communicating with at least the outermost of said plies and said breaker strip, said rubber covering being provided with a radial passageway arranged to communicate with at least the outer of said plies and the atmosphere when the tire is mounted on a supporting rim.

4. A vulcanized pneumatic tire including plies of fabric having a rubber covering thereover and a breaker strip embedded in said rubber covering, said plies being provided with a passageway communicating with the interior of said tire and said breaker strip, said rubber covering being provided with a radial passageway arranged to communicate with at least the outer of said plies and the atmosphere when the tire is mounted on a supporting rim.

5. A vulcanized pneumatic tire including plies of fabric having a rubber covering thereover and a breaker strip embedded in said rubber covering, a fluid absorptive medium communicating between at least the outermost of said plies and said breaker strip, said rubber covering being provided with a radial passageway arranged to communicate with at least the outer of said plies and the atmosphere when the tire is mounted on a supporting rim.

6. A vulcanized pneumatic tire including plies of fabric having a rubber covering thereover and a breaker strip embedded in said rubber covering, a fabric cord extending from at least the outermost of said plies to said breaker strip and capable of conducting fluid, said rubber covering being provided with a radial passageway arranged to communicate with at least the outer of said plies and the atmosphere when the tire is mounted on a supporting rim.

7. A vulcanized pneumatic tire including plies of fabric having a rubber covering thereover and a breaker strip embedded in said rubber covering, means providing a passageway communicating with at least the outermost of said plies and said breaker strip, and means for conducting fluid from any of said plies to the atmosphere when the tire is mounted on a supporting rim.

8. A vulcanized pneumatic tire including plies of fabric having a rubber covering thereover and a breaker strip embedded in said rubber covering, a fluid absorptive medium communicating with at least the outermost of said plies and said breaker strip, and means for conducting fluid from any of said plies to the atmosphere when the tire is mounted on a supporting rim.

9. A vulcanized pneumatic tire including plies of fabric having a rubber covering thereover and a breaker strip embedded in said rubber covering, a fabric cord extending from at least the outermost of said plies to said breaker strip and capable of conducting fluid, and means for conducting fluid from any of said plies to the atmosphere when the tire is mounted on a supporting rim.

10. In a unit of the class described the combination with a drop-center rim having peripheral, substantially radially extending flanges of a pneumatic tire having beads seating on said rim, an inflatable tube within said tire arranged to press said beads against said flanges when said tube is inflated, thus forming an impervious seal between said beads and flanges, and one or more minute passageways in the exterior wall of said tire above and adjacent said flanges communicating at least with one of said plies and the atmosphere.

RALPH B. DAY.